(12) United States Patent
Lee et al.

(10) Patent No.: US 9,171,408 B2
(45) Date of Patent: Oct. 27, 2015

(54) ENGINE CONTROL METHOD OF PLUG-IN HYBRID ELECTRIC VEHICLE

(71) Applicant: Hyundai Motor Company, Seoul (KR)

(72) Inventors: Keunseok Lee, Hwaseong-si (KR); Jae Wang Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/445,968

(22) Filed: Jul. 29, 2014

(65) Prior Publication Data

US 2015/0149032 A1    May 28, 2015

(30) Foreign Application Priority Data

Nov. 26, 2013  (KR) .......................... 10-2013-0144765

(51) Int. Cl.
   *B60W 20/00*   (2006.01)
   *G07C 5/08*    (2006.01)

(52) U.S. Cl.
   CPC ............. *G07C 5/0808* (2013.01); *B60W 20/50* (2013.01); *Y10S 903/903* (2013.01)

(58) Field of Classification Search
   CPC combination set(s) only.
   See application file for complete search history.

(56) References Cited

U.S. PATENT DOCUMENTS

| 8,479,849 | B2 | 7/2013 | Leone | |
| 8,751,081 | B2 * | 6/2014 | Kato et al. | 701/22 |
| 2009/0150015 | A1 * | 6/2009 | Okubo et al. | 701/22 |
| 2011/0184600 | A1 * | 7/2011 | Kristinsson et al. | 701/22 |
| 2012/0178584 | A1 | 7/2012 | Andri | |
| 2012/0226404 | A1 | 9/2012 | Leone | |

FOREIGN PATENT DOCUMENTS

| JP | 2012-116271 A | 6/2012 |
| JP | 5158258 B2 | 3/2013 |
| KR | 10-20060106729 A | 10/2006 |
| KR | 10-20090086127 A | 8/2009 |
| KR | 10-1013665 B1 | 2/2011 |

* cited by examiner

*Primary Examiner* — Thomas Tarcza
*Assistant Examiner* — Edward Pipala
(74) *Attorney, Agent, or Firm* — McDermott Will & Emery LLP

(57) ABSTRACT

An engine control method of a plug-in hybrid electric vehicle may include accumulating an EV accumulated driving distance or an EV accumulated driving time. The EV accumulated driving distance or the EV accumulated driving time is compared with each of reference values. An engine is operated for inspection if the EV accumulated driving distance or the EV accumulated driving time is greater than each of the reference values.

4 Claims, 3 Drawing Sheets

ENGINE CONTROL METHOD OF PLUG-IN HYBRID ELECTRIC VEHICLE

CROSS-REFERENCE TO RELATED APPLICATION

This application claims the benefit of priority to Korean Patent Application No. 10-2013-0144765 filed in the Korean Intellectual Property Office on Nov. 26, 2013, the entire contents of which are incorporated herein by reference.

TECHNICAL FIELD

The present disclosure relates to an engine control method of a plug-in hybrid electric vehicle. More particularly, the present disclosure relates to an engine control method of a plug-in hybrid which determines whether an engine should be operated for inspection and maintenance by calculating a driving distance or time without operating the engine.

BACKGROUND

Generally, a hybrid electric vehicle is driven by effectively combining at least two different power sources. The hybrid electric vehicle generally uses an engine driven by fossil fuel combustion and a motor driven by a rechargeable battery.

The hybrid electric vehicle can be classified as two types depending on a power source of the engine and the motor. A parallel hybrid electric vehicle is directly driven by mechanical power of the engine and uses electric power of the motor in case of need. A series hybrid electric vehicle is driven by the electric power of the motor which is converted from the mechanical power of the engine by a generator. Therefore, the parallel hybrid electric vehicle is suitable for high-speed driving or long distance driving, whereas the series hybrid electric vehicle is suitable for city driving or short distance driving.

Recently, a plug-in hybrid electric vehicle (PHEV) which is driven in an electric vehicle (EV) mode for a short distance by a larger battery than that of the hybrid electric vehicle and is driven in a hybrid electric vehicle (HEV) mode for long distance has been developed. That is, the PHEV simultaneously has an internal combustion engine driven by gasoline and a battery powered engine, so that the PHEV uses one of the two engines or both engines. The PHEV has a high capacity and high voltage battery, so that it needs to be charged by electricity from the outside.

The PHEV is driven in the HEV mode when a driver's demand for power is greater than a maximum output power of the motor, and the battery or a battery state of charge (SOC) is low. On the other hand, the PHEV is driven in the EV mode when the driver's demand for power is lower than the maximum output power of the motor, and the battery and the battery is charged by the electricity from the outside.

However, if the PHEV is driven in the EV mode without operating the engine for a relatively long period of time to improve fuel efficiency, corrosion, leakage of a lubricant, fuel damage, and so on can occur. Therefore, the plug-in hybrid electric vehicle should drive the engine periodically even though the engine operation is unnecessary for driving.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides an engine control method of a plug-in hybrid electric vehicle having advantages of determining whether an engine should operate if the plug-in hybrid electric vehicle repeatedly drives for a relatively short distance, and periodically operating the engine for improving engine performance and durability according to a driving condition of the plug-in hybrid electric vehicle.

According to an exemplary embodiment of the present disclosure, an engine control method of a plug-in hybrid electric vehicle may include accumulating an electric vehicle (EV) accumulated driving distance or an EV accumulated driving time. The EV accumulated driving distance or the EV accumulated driving time is compared with each of reference values. An engine is operated for inspection if the EV accumulated driving distance or the EV accumulated driving time is greater than each of the reference values.

The EV accumulated driving distance or the EV accumulated driving time may be reset when the engine is operated.

After operating the engine for inspection, the method may further include stopping the engine when a corresponding condition is satisfied.

The EV accumulated driving distance or the EV accumulated driving time may be stored in a memory of the vehicle and may be read from the memory after an ignition switch is on.

The memory of the vehicle may be non-volatile.

According to another exemplary embodiment of the present disclosure, an engine control method of a plug-in hybrid electric vehicle that may include accumulating an EV accumulated driving distance or an EV accumulated driving time. The EV accumulated driving distance or the EV accumulated driving time is compared with each of reference values. A need of engine operation for inspection is informed if the EV accumulated driving distance or the EV accumulated driving time is greater than each of the reference values.

The method may further include operating the engine for inspection if a signal to operate the engine for inspection is input.

According to another exemplary embodiment of the present disclosure, an engine control method of a plug-in hybrid electric vehicle may operate an engine for inspection if an EV accumulated driving distance or an EV accumulated driving time which is driven in EV mode without the engine operation is greater than reference values.

According to an exemplary embodiment of the present disclosure as stated above, the engine control method of a plug-in hybrid electric vehicle may determine whether the engine should operate if the plug-in hybrid electric vehicle repeatedly drives for short distances and periodically operates the engine for improving engine performance and durability according to a driving condition of the plug-in hybrid electric vehicle.

DETAILED DESCRIPTION OF THE EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

An exemplary embodiment of the present disclosure will hereinafter be described in detail with reference to the accompanying drawings.

Figure 1:
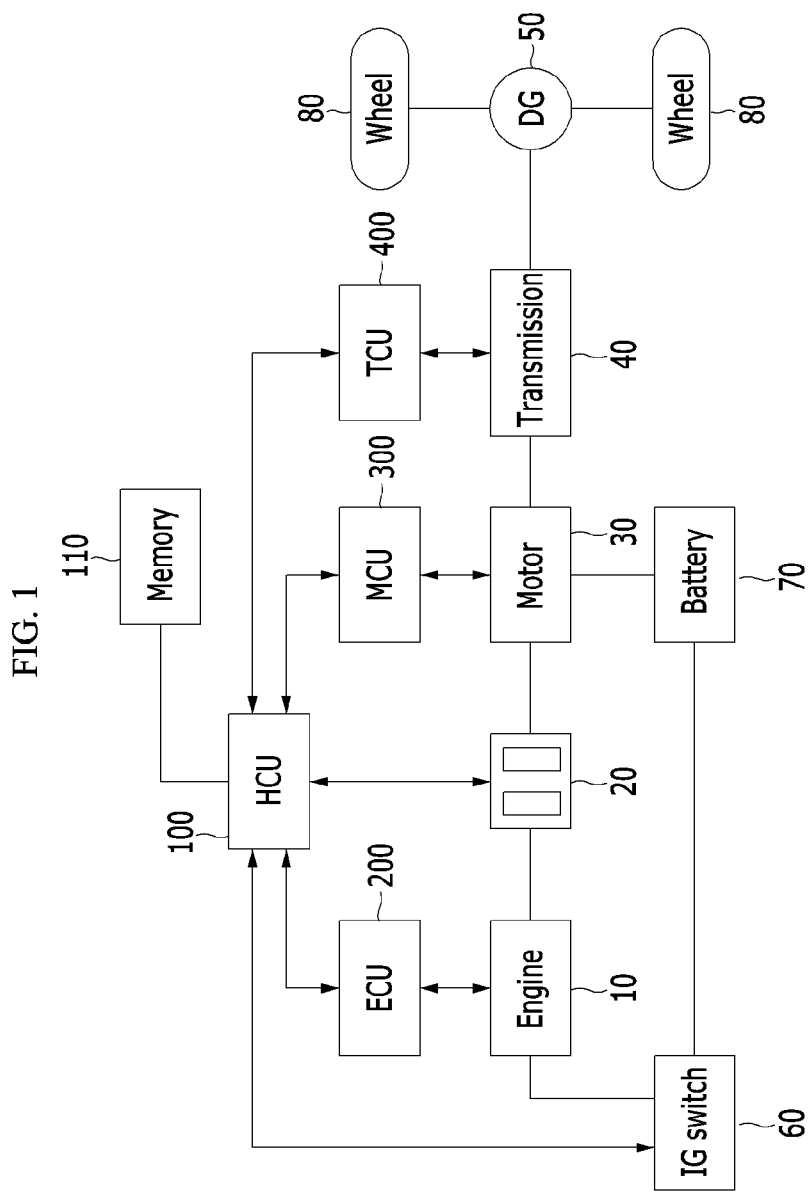
FIG. 1 is a schematic diagram of a hybrid system to which an engine control method of a plug-in hybrid electric vehicle is applied according to an exemplary embodiment of the present disclosure.

FIG. 1 is a schematic diagram of a hybrid system to which an engine control method of a plug-in hybrid electric vehicle is applied according to an exemplary embodiment of the present disclosure. The hybrid system as shown in FIG. 1 is an exemplary embodiment of the present disclosure for better comprehension and ease of description. Therefore, a method of controlling torque intervention of a hybrid electric vehicle according to an exemplary embodiment of the present disclosure may not only be applied to the hybrid system as shown in FIG. 1, but may also be applied to all other hybrid systems.

As shown in FIG. 1, the hybrid system to which the present disclosure is applied may include an engine 10, an engine clutch 20, a motor 30, a transmission 40, a differential gear 50, an ignition switch 60, a battery 70, and a wheel 80.

The engine clutch 20 may interrupt power transfer between the engine 10 and the motor 30. The ignition switch 60 may start the engine 10 or start the motor 30 through the battery 70 connected to the motor 30. The battery 70 supplies voltage to the motor 80 in an electric vehicle (EV) mode, and is charged by regenerative braking energy during braking or with electric power from outside. In addition, the hybrid system may include a hybrid control unit (HCU) 100, a non-volatile memory 110 connected to the HCU 100, an engine control unit (ECU) 200, a motor control unit (MCU) 300, and a transmission control unit (TCU) 400.

The ECU 200 controls the entire operation of the engine 10, the MCU 300 controls an entire operation of the motor 30, and the TCU 400 controls the entire operation of the transmission 40. The HCU 100 controls the entire operation of the hybrid electric vehicle and exchanges data by connecting with each controller, so that the HCU 100 controls an output torque of the engine 10 and the motor 30 and a target gear ratio. The non-volatile memory 110 is a storage device installed inside or outside of the HCU 100, and deletes data, inputs new data, and preserves data even if power is cut. The non-volatile memory 110 may include a flash memory or an electrically erasable and programmable read only memory (EEP-ROM).

The hybrid system as described above is obvious to a person of an ordinary skill in the art, so that a detailed explanation thereof will be omitted.

Figure 2:
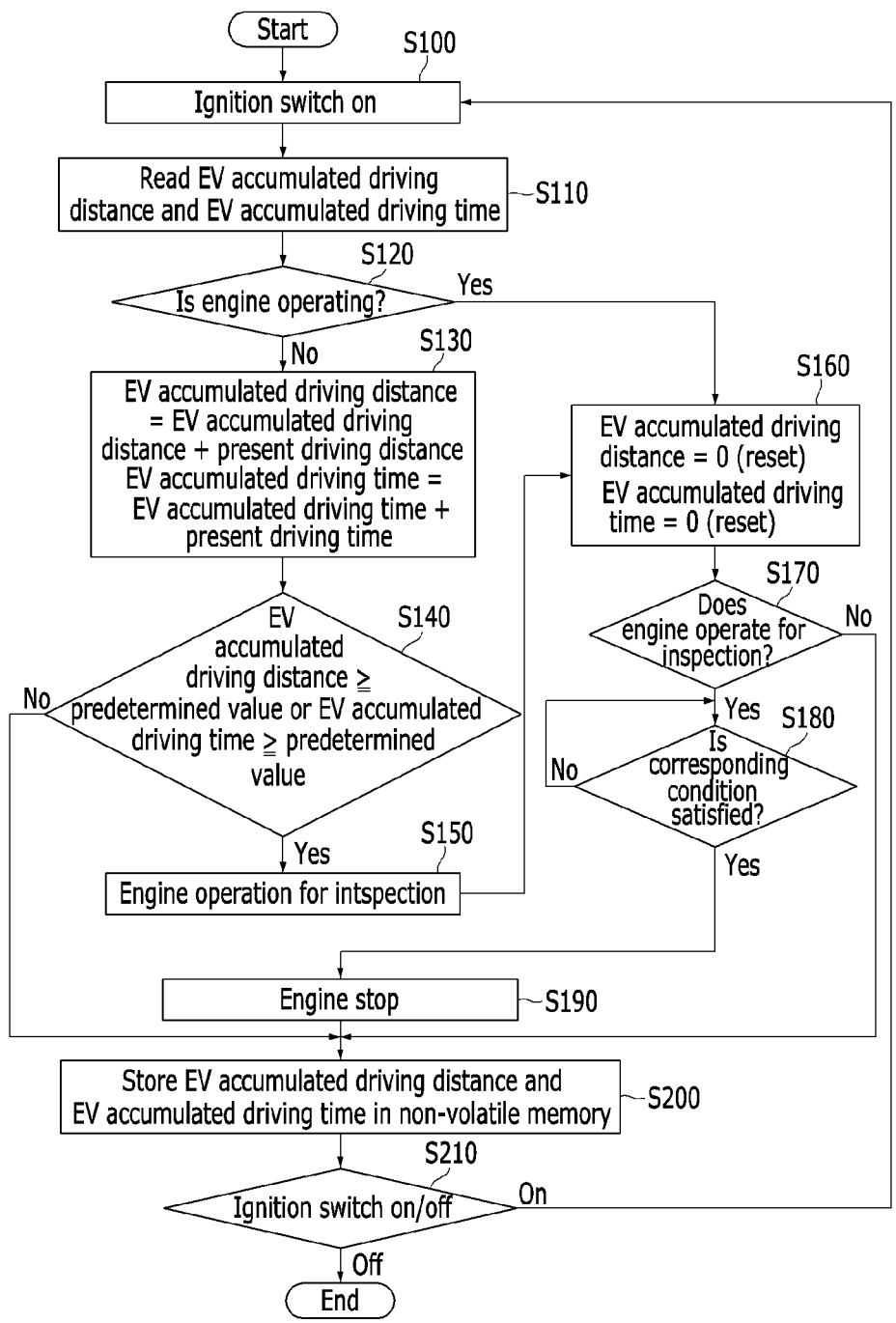
FIG. 2 is a flowchart showing an engine control method of a plug-in hybrid electric vehicle according to an exemplary embodiment of the present disclosure.

Hereinafter, an exemplary embodiment of the present disclosure will be described in detail referring to FIG. 2. FIG. 2 is a flowchart showing an engine control method of a plug-in hybrid electric vehicle according to an exemplary embodiment of the present disclosure.

As shown in FIG. 2, an engine control method of a plug-in hybrid electric vehicle according to an exemplary embodiment of the present disclosure starts with the ignition switch 60 being switched on at step S100 which should be understood as turning on the ignition switch of a starting motor as well as starting engine ignition of the plug-in hybrid electric vehicle.

If the ignition switch 60 is switched on, the HCU 100 reads an EV accumulated driving distance and an EV accumulated driving time stored in the non-volatile memory 110 at step S110. Then, the ECU 200 or the HCU 100 determines whether the engine 10 operates at step S120.

If the engine 10 is not operated at the step S120, the process proceeds to step S130, and on the contrary, if the engine 10 is operated at the step S120, the process proceeds to step S160. The plug-in hybrid electric vehicle can be driven by only the battery 70 in an EV mode, which means the engine 10 is not operated in this specification. The scope of the appended claims should be understood as the plug-in hybrid electric vehicle being driven by the motor 30 in the EV mode without the engine 10 driving as well as the plug-in hybrid electric vehicle being stopped.

If the engine 10 is not operated at the step S120, the HCU 100 accumulates the EV accumulated driving distance and the EV accumulated driving time by adding the EV accumulated driving distance and the EV accumulated driving time read from the step S110 to present driving distance and present driving time at step S130. On the other hand, if the engine 10 operates at the step S120, the HCU 100 resets the EV accumulated driving distance and the EV accumulated driving time to 0 at step S160.

The HCU 100 compares the EV accumulated driving distance and the EV accumulated driving time accumulated at the step S130 with each of reference values at step S140. If the EV accumulated driving distance or the EV accumulated driving time is greater than each of the reference values, the HCU 100 operates the engine 10 for inspection at step S150. If the EV accumulated driving distance and the EV accumulated driving time are less than each of the reference values, the process proceeds to step S200 because the engine 100 does not need operate.

If the engine 10 operates for inspection at the step S150, the process proceeds to the step S160 in order to determine whether or not the engine 10 needs to be operated. Thus, the EV accumulated driving distance and the EV accumulated driving time are reset to 0. If the EV accumulated driving distance and the EV accumulated driving time are reset at the step S160 by proceeding from the step S120 or the step S150, the HCU 100 determines whether a present operation of the engine 10 is necessary for inspection at step S170. That is, according to the step S170 after the step S120 where the engine 10 operates, the plug-in hybrid electric vehicle is driven in an HEV mode, so the process proceeds to step S200.

On the other hand, in case of the step S170 after the step S150 where the engine 10 is operated for inspection, the engine 10 should be operated for more than a predetermined time in order to inspect the engine 10. Therefore, in case the engine 10 is operated for inspection, the engine 10 is operated until a corresponding condition is satisfied at step S180. The corresponding condition may be satisfied if the engine 10 operates for more than a set period of time. If the corresponding condition is satisfied at the step S180, the HCU 100 stops the engine 10 at step S190.

As described above, the process proceeds to the step S200 if the EV accumulated driving distance and the EV accumulated driving time are less than each of the reference values at the step S140, the engine 10 does not operate for inspection at the step S170, or the engine 10 stops the operation at the step S190.

The EV accumulated driving distance and the EV accumulated driving time that are accumulated at the step S130 or reset at the step S160 are stored in the non-volatile memory at the step S200. After that, the process returns to the step S100 and repeatedly performs each step of the engine control method of the plug-in hybrid electric vehicle according to an exemplary embodiment of the present disclosure while the ignition switch 60 is switched on. If the ignition switch 60 is switched off, the HCU 100 finishes the engine control method of the plug-in hybrid electric vehicle according to an exemplary embodiment of the present disclosure.

Hereinafter, another exemplary embodiment of the present disclosure will be described in detail referring to FIG. 3.

Figure 3:
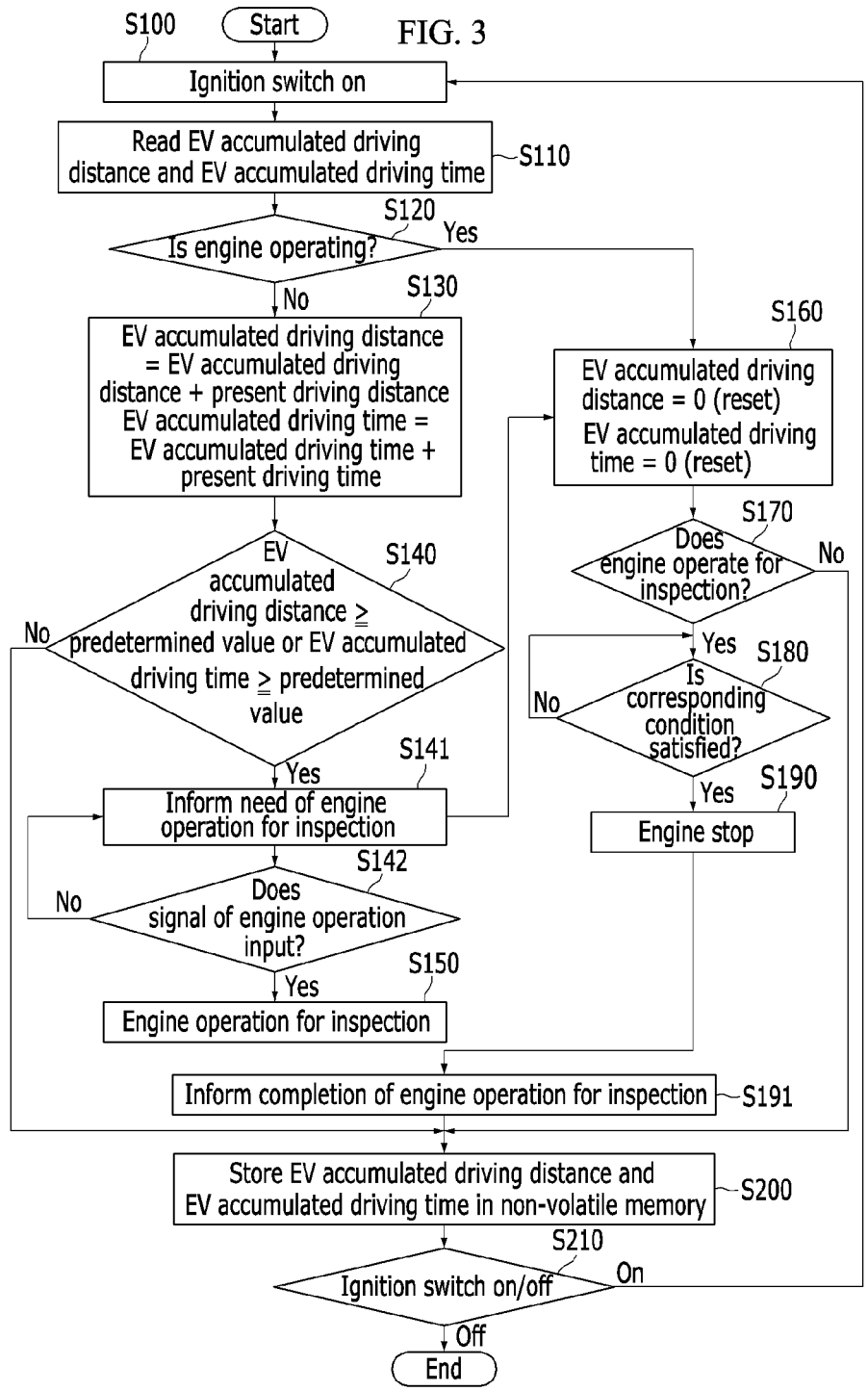
FIG. 3 is a flowchart showing an engine control method of a plug-in hybrid electric vehicle according to another exemplary embodiment of the present disclosure.

FIG. 3 is a flowchart showing an engine control method of a plug-in hybrid electric vehicle according to another exemplary embodiment of the present disclosure. As shown in FIG. 3, the steps from S100 to S120 proceed the same as the engine control method of the plug-in hybrid electric vehicle as shown in FIG. 2.

The step S130 in which the HCU 100 accumulates the EV accumulated driving distance and the EV accumulated driving time and the step S160 in which the HCU 100 resets the EV accumulated driving distance and the EV accumulated driving time are the same steps as shown in FIG. 2. That is, the steps that are like reference numerals between FIG. 2 and FIG. 3 are performed equally, so the detailed description thereof will be omitted.

If the EV accumulated driving distance or the EV accumulated driving time is greater than each of the reference values at the step S140, the process proceeds to step S141 where the HCU 100 informs that the engine operation for inspection is needed. On the other hand, if the EV accumulated driving distance and the EV accumulated driving time are less than each of the reference values, the process proceeds to the step S200 where the EV accumulated driving distance and the EV accumulated driving time are stored in the non-volatile memory. A navigator or an instrument cluster of the plug-in hybrid electric vehicle may be used for informing the need of the engine operation for inspection at the step S141. In addition, an adverse reaction of a driver about the engine operation is decreased by informing the need of the engine operation for inspection through the navigator or the cluster.

After informing the need of the engine operation for inspection at the step S141, the HCU 100 determines whether a signal of the engine operation for inspection is input at step S142. If the signal of the engine operation for inspection is input at the step S142, the process proceeds to the step S150 where the HCU 100 operates the engine for inspection. On the contrary, if the signal of the engine operation for inspection is not input at the step S142, the process returns to the step S141 where the HCU 100 informs the need of the engine operation for inspection. If the engine operates at the step S120, or the engine operates for inspection at the step S150, the process proceeds to the step S160 where the HCU 100 resets the EV accumulated driving distance and the EV accumulated driving time to 0.

Then, the same as shown in FIG. 2, the HCU 100 determines whether the present operation of the engine 10 is necessary for inspection at the step S170, and the corresponding condition is satisfied at the step S180. If the engine operation for inspection is performed sufficiently to satisfy the corresponding condition at the step S180, the HCU 100 stops the engine 10 at the step S190 and informs a completion of the engine operation for inspection through the navigator or the cluster at step S191. The HCU 100 informs the completion of the engine operation for inspection to the driver through the navigator or the cluster at the step S191, so the driver can recognize that the engine is in good condition.

If the EV accumulated driving distance and the EV accumulated driving time are less than each of the reference values at the step S140, the engine 10 does not operate for inspection at the step S170, or after informing the completion of the engine operation for inspection at the step S191, the process proceeds to the step S200. After storing the EV accumulated driving distance and the EV accumulated driving time in the non-volatile memory at the step S200, the HCU 100 repeatedly performs or finishes the engine control method of the plug-in hybrid electric vehicle according to an exemplary embodiment of the present disclosure by determining the ignition switch 60 on/off position at the step S210.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An engine control method of a plug-in hybrid electric vehicle, the method comprising steps of:
    accumulating an electric vehicle (EV) accumulated driving distance or an EV accumulated driving time;
    comparing the EV accumulated driving distance with a reference driving distance or the EV accumulated driving time with a reference driving time;
    informing that an engine operation for inspection is necessary when the EV accumulated driving distance is greater than the reference driving distance or the EV accumulated driving time is greater than the reference driving time; and
    operating an engine for inspection if a signal to operate the engine for inspection is input;
    wherein the EV accumulated driving distance and the EV accumulated driving time are stored continuously in a memory of the vehicle and read from the memory after an ignition switch is switched on.

2. The method of claim 1, wherein the EV accumulated driving distance or the EV accumulated driving time is reset when the engine operates.

3. The method of claim 1 further comprising a step of:
    stopping the engine when a corresponding condition is satisfied after the step of operating the engine for inspection.

4. The method of claim 1, wherein the memory of the vehicle is non-volatile.

* * * * *